US009582591B2

(12) United States Patent
Vanderwende et al.

(10) Patent No.: US 9,582,591 B2
(45) Date of Patent: Feb. 28, 2017

(54) GENERATING VISUAL SUMMARIES OF RESEARCH DOCUMENTS

(75) Inventors: Lucretia Henrica Vanderwende, Sammamish, WA (US); Oscar Gerardo Naim, Redmond, WA (US); Krist Wongsuphasawat, Silver Spring, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 13/045,543

(22) Filed: Mar. 11, 2011

(65) Prior Publication Data
US 2012/0233151 A1   Sep. 13, 2012

(51) Int. Cl.
G06F 17/30        (2006.01)
(52) U.S. Cl.
CPC .............................. G06F 17/30873 (2013.01)
(58) Field of Classification Search
CPC ............. G06F 17/30728; G06F 17/241; G06F 17/30554; G06F 17/30011; G06F 17/30882; G06F 17/3089; G06F 17/30991; G06F 17/30112; G06F 17/30696; G06F 17/30716; G06F 17/30994; G06F 17/30873
USPC .................................. 707/722, 769, E17.014
See application file for complete search history.

(56) References Cited

U.S. PATENT DOCUMENTS

| 5,832,494 A * | 11/1998 | Egger et al. ............ 707/999.005 |
| 6,289,342 B1 * | 9/2001 | Lawrence et al. |
| 7,555,713 B2 | 6/2009 | Yang |
| 7,778,982 B2 | 8/2010 | Baker |
| 8,145,617 B1 * | 3/2012 | Verstak ............. G06F 17/30696 707/708 |
| 8,196,030 B1 * | 6/2012 | Wang et al. .................. 715/200 |
| 2004/0122846 A1 | 6/2004 | Chess et al. |
| 2004/0243614 A1 | 12/2004 | Boone et al. |
| 2007/0150800 A1 | 6/2007 | Betz et al. |
| 2007/0179776 A1 | 8/2007 | Segond et al. |
| 2007/0239704 A1 * | 10/2007 | Burns et al. ....................... 707/5 |
| 2008/0282187 A1 * | 11/2008 | Buschman ............ G06F 3/0482 715/784 |
| 2010/0031141 A1 | 2/2010 | Summers et al. |
| 2010/0169299 A1 | 7/2010 | Pollara |

(Continued)

OTHER PUBLICATIONS

Bogdanschi et al. Article: "An annotation database for multimodal scientific data", Proc. SPIE 7255, Multimedia Content Access: Algorithms and Systems III, 72550G (Jan. 19, 2009).*

(Continued)

*Primary Examiner* — Evan Aspinwall
(74) *Attorney, Agent, or Firm* — Alin Corie; Sandy Swain; Micky Minhas

(57) ABSTRACT

Generation of a graphical visualization that summarizes a research document is described herein. A data store includes first data that identifies a first research document, second data that identifies a second research document that includes a citation to the first research document, and at least a portion of a sentence in the second research document that includes the citation to the first research document. A graphical visualization is generated that includes a first node that is representative of the first research document, a graphical object that indicates that the second research document includes the citation to the first research document, and the at least the portion of the sentence that includes the citation.

20 Claims, 10 Drawing Sheets

(56) References Cited

U.S. PATENT DOCUMENTS

2010/0228693 A1     9/2010   Dawson et al.
2011/0219017 A1*   9/2011   Cui ............................... 707/769

OTHER PUBLICATIONS

Joosse, W., "User Trainable Fact", Retrieved at << http://hmi.ewi.utwente.nl/verslagen/afstudeer/JoosseWouterFinalThesis.pdf >>, Jun. 2007, pp. 1-86.

* cited by examiner

GENERATING VISUAL SUMMARIES OF RESEARCH DOCUMENTS

BACKGROUND

The research community has contributed advances in a variety of scientific fields, including medicine, computing, amongst several others. To contribute to advances in a particular field, a researcher must have a considerable amount of knowledge pertaining to that field. Conventionally, the researcher locates a research document that may be of interest through conducting a search, for example. The researcher then determines whether a particular research document is of particular interest by reviewing the title of the research document as well as the abstract of the research document. If the researcher, based on the title and abstract, feels that the research document is germane to the research interests of the researcher, then the researcher will read the entirety of the located research document.

It can be ascertained that the field of interest to the researcher can include numerous research documents written by many different authors. Accordingly, the researcher can spend a significant amount of time searching for research documents of interest. Author-generated summaries (abstracts) of a research document, however, may be misleading as to the impact of the research document over time. Therefore, a researcher may spend an inordinate amount of time reading research documents that are not of interest to the particular field of the researcher. Further, at the time of authorship of a research document, the author may not correctly predict the impact of certain disclosures of the research document. In other words, the author may feel, at the time of authorship, that a particular portion of the research document is the focal point of the research document. Over time, however, another portion of the research document may have a greater impact in a particular field. Thus, a subsequent researcher is unable to quickly locate this portion without reading the entirety of the research document.

To assist researchers in quickly locating research documents that may be of interest to a researcher, systems have been developed that generate author graphs, which visually indicates to a researcher which authors are often co-authors on research documents. Therefore, for example, the researcher can ascertain that a first author co-authors with a second author relatively frequently, thereby informing the researcher that such researcher may also be interested in other research documents authored by the second author.

SUMMARY

The following is a brief summary of subject matter that is described in greater detail herein. This summary is not intended to be limiting as to the scope of the claims.

Described herein are various technologies pertaining to generating a graphical visualization of a research document to a user, wherein the graphical visualization is based at least in part upon citations or annotations made to the research document subsequent to the research document being published. Accordingly, the graphical visualization of the research document provides the user with a backwards (in time) facing perspective of the research document. Pursuant to an example, a user can issue a query pertaining to a research document. For example, the query can include the title or a part of the title of the research document, the author of the research document, etc. The query can be executed over contents of a data repository, wherein such contents comprise data pertaining to the research document. This data can include the identity of the research document, the identity of one or more authors that authored the research document, citation data that includes citations to the research document by other research documents, annotations made to the research document by annotators, identities of annotators of the research documents, etc. In a specific example, the contents of the data repository pertaining to the research document can comprise sentences in other research documents that include citations to the research document.

A graphical visualization of the research document may then be presented to the user, wherein the graphical visualization supports user interaction therewith, thereby allowing the user to perform a search pertaining to the research document by interacting with the graphical visualization. The graphical visualization can act as a graphical summary of the document, wherein the graphical summary comprises data generated by users that have reviewed the research document. For instance, the graphical visualization can comprise a first node that is representative of the research document that is of interest to the user. The graphical visualization may also comprise a plurality of other nodes that are representative of citations to the research document from other research documents. In another example, the plurality of other nodes can represent documents that include citations to the research document. Edges between the first node and the plurality of other nodes can graphically depict to the user that the research document has a plurality of citations thereto. The graphical visualization can also comprise at least a portion of the sentences that included citations to the research document. By reviewing these citations to the research document, the user can relatively quickly ascertain why other researchers in the field feel that the research document is noteworthy.

As mentioned above, a significant amount of data can be collected pertaining to the research document, thereby allowing graphical visualizations that can visually depict an extensive amount of rich information. For instance, nodes can be presented in the graphical visualization that represent authors of documents that include citations to the research document. In another example, nodes in the graphical visualization can represent authors of the research document. Still further, nodes in the graphical visualization can represent annotations made to the research document by annotators.

Additionally, the graphical visualization can include selectable nodes, such that the graphical visualization provided to the user changes as the user selects nodes in the graphical visualization. For instance, if the graphical visualization includes a node that represents a second research document that comprises a citation to a first research document (that is originally of interest to the user), the user can select such node, thereby causing the graphical visualization to alter. The alteration in the graphical visualization can be, for instance, the inclusion of other nodes that represent research documents that comprise citations to the second research document. Therefore, the user can visually navigate through a plurality of research documents, authors, etc. to obtain information about those entities.

Other aspects will be appreciated upon reading and understanding the attached figures and description.

DETAILED DESCRIPTION

Figure 1:
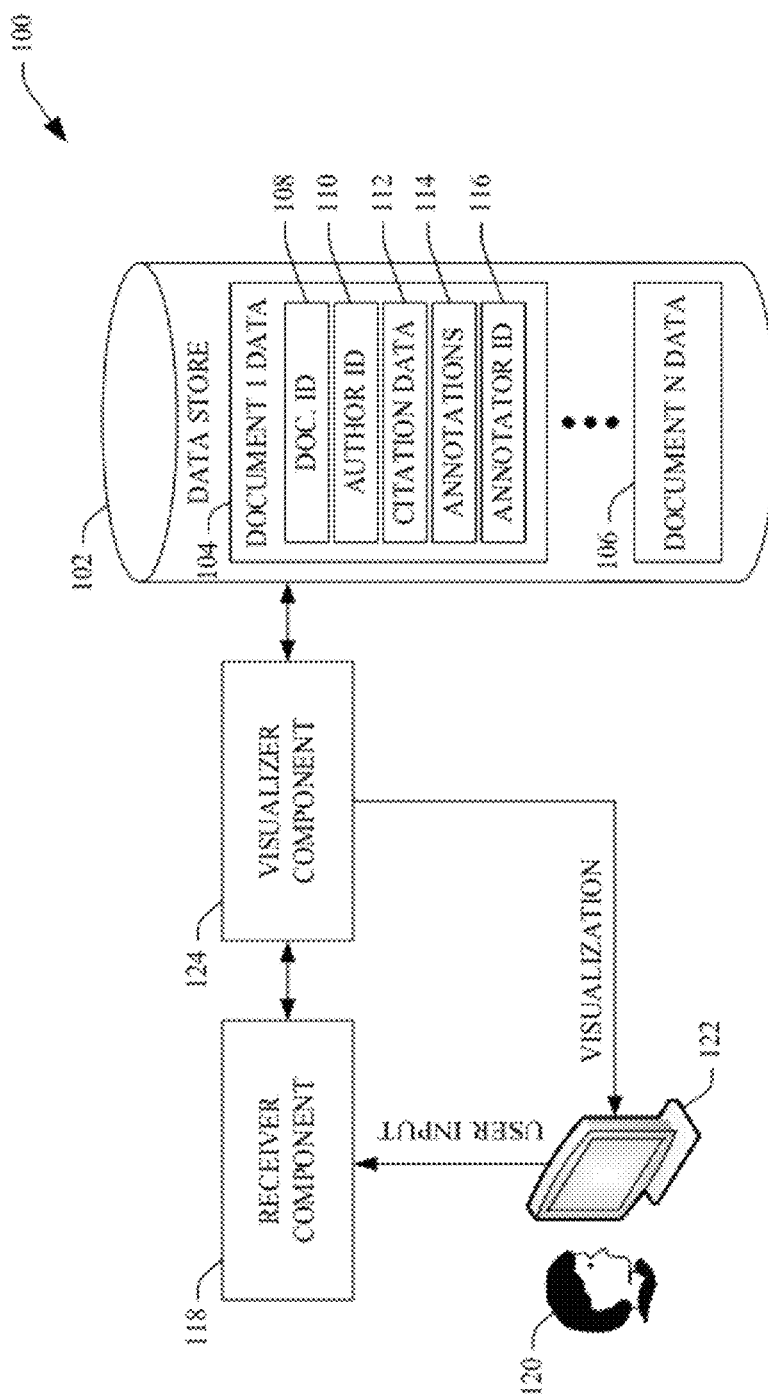
FIG. 1 is a functional block diagram of an exemplary system that facilitates generating a graphical visualization of a research document.

Various technologies pertaining to generating interactive graphical visualizations of research documents will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference to FIG. 1, an exemplary system 100 that facilitates generating a graphical summary visualization of a research document is illustrated. A research document, as the term is used herein, may be a document that comprises at least one author (where the author can be anonymous), and at least one citation to one or more other research documents (e.g., a bibliography). Accordingly, a research document may be a scientific paper, a legal opinion or other suitable research document. Further, the system 100 can be comprised by a server, wherein components of the server are accessible to a user by way of a web browser. Alternatively, the system 100 can be comprised by a client computing device.

The system 100 comprises a data store 102, which can be a hard drive, memory, or the like. The data store 102 comprises information pertaining to a plurality of research documents. Specifically, the data store 102 comprises first document data 104 through nth document data 106. In an example, the first document data 104 can comprise a document identity 108 that identifies the first document. The document identity 108, for instance, can be the title of the document, full citation information for the document, or other data that identifies the first research document. The first document data 104 can also include an author identity 110 that identifies at least one author of the first research document. The first document data 104 may further include citation data 112 that can, for instance, identify documents that are cited by the first research document. Additionally or alternatively, the citation data 112 can include information pertaining to documents that cite to the first document. In such a case, for example, the citation data 112 can comprise an identity of a second research document that cites to the first research document, the citation to the first document, and the sentence in the second research document that includes the citation to the first document. Accordingly, the citation data 112 can comprise a plurality of citations to the first research document from various other research documents, including the sentences in the various other research documents that include citations to the first research document.

The first document data 104 may also include one or more annotations 114 to the first research document made by reviewers of the first research document (e.g., non-authors of the research document). A system will be described herein that allows for reviewers of the first research document to assign annotations to the first research document and cause such annotations to be shared so that the annotations are accessible to others in a searchable data repository. Moreover, the first document data 104 can comprise at least one annotator identity 116 that identifies one or more annotators to the first research document. While not shown, it is to be understood that the nth document data 106 can also include a document identity, an author identity, citation data, annotations, annotator identities, etc.

The system 100 further comprises a receiver component 118 that receives input from a user 120. For instance, the user 120 may be utilizing a client computing device 122 such as a desktop computer, a laptop computer, a portable computing device (e.g., a mobile telephone) or other suitable client computing device. The user 120 may provide the user input by way of a web browser executing on the client computing device 122. For instance, the user input may be a query, a gesture, a spoken command, selection of a graphical button, etc. Thus, the user input may be a query that includes at least a portion of the title of the first research document, a name of the author of the first research document, data that describes content of an annotation that has been assigned to the first research document, etc.

A visualizer component 124 is in communication with receiver component 118 and can access the data store 102 responsive to the receiver component 118 receiving the user input. The visualizer component 124 can generate a graphical summary of the first research document, wherein the graphical summary comprises at least a portion of a sentence in a second research document that includes a citation to the first research document. In other words, the visualizer component 124 can cause at least a portion of the first document data 104 to be presented in graphical form to the user 120 on the display screen of the client computing device 122.

In an example, the visualizer component 124 can generate a graphical visualization/graphical summary of the first research document, wherein the graphical visualization/graphical summary includes a first node that is representative of the first research document, a second node that is representative of a citation to the first research document or a document that includes a citation to the first research document, an edge between the two nodes that illustrates the relationship between the first research document and the citation thereto, and at least a portion of the sentence in the second research document that includes the citation to the first research document. Accordingly, the user 120 can be provided with a graphical visualization that indicates that one or more research document cited the first research document, and also indicates why such first research document was cited by citing research documents. Accordingly, this graphical visualization/graphical summary provides a backwards in time perspective of the first research document that indicates influence of the first research document over time.

It is to be understood that the graphical visualization/summary described above is exemplary in nature, and that other graphical formats for representing data in the data store 102 will be contemplated by those skilled in the art. For example, rather than generating a graphical summary of a document, the visualizer component 124 can be configured to generate a graphical summary of an author. Therefore, for instance, the visualizer component 124 can search the data store 102 for a particular author identity and can graphically depict the author as a node in a graphical visualization. The visualizer component 124 may then cause other nodes to be presented that represent attributes pertaining to the identified author. For instance, such other nodes can represent documents that were authored by the identified author, documents that include citations to research documents authored by the identified author, annotations made to research documents authored by the identified author, co-authors of the identified author, etc. Edges between these nodes can visually indicate to the user 120 relationships between the identified author and the graphically displayed/represented attributes.

In still yet another example, the user 120 may issue a query that pertains to an annotation that has been assigned to the first research document. Responsive to receiving such query, the visualizer component 124 can generate a graphical visualization, wherein a node that represents the annotation is placed proximate to the center of the visualization. Other nodes shown in the graphical visualization can be representative of documents have been assigned the annotation, can be representative of an author of the annotation, can be representative of the individual portions of the annotation, etc.

As mentioned previously, graphical visualizations output by the visualizer component 124 can be navigated by the user 120. For instance, if a graphical visualization presented to the user comprises a plurality of nodes, wherein a first node is representative of the first research document and other nodes are representative of research documents that cite to such research document, the user 120 can select one of the other nodes to focus the graphical visualization on a selected node. This can cause the visualizer component 124 to execute a search over contents of the data store 102 to locate data that is germane to the research document that is represented by the selected node. Thereafter, other nodes can be presented around the selected node, wherein these other nodes are connected to the selected nodes by edges, which indicate that other research documents cite the research document represented by the node selected by the user 120. Through this approach, the user 120 can navigate through authors, documents, etc. to locate information in a particular research field that is of interest to the user 120.

Figure 2:
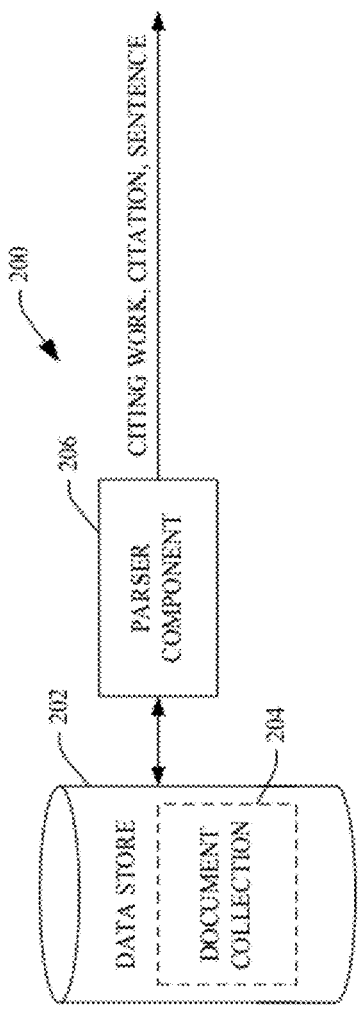
FIG. 2 is a functional block diagram of an exemplary system that facilitates extracting citation data from research documents in a document collection.

With reference now to FIG. 2, an exemplary system 200 that facilitates generating/extracting citation data for research documents is illustrated. The system 200 comprises a data store 202 that comprises a document collection 204. The document collection 204 can comprise a plurality of research documents, wherein such research documents can be in word processing format, can be web pages, or the like. A parser component 206 can access the data store 202 and analyze documents in the document collection 204, and can extract citation data from such documents. In an example, for each document in the document collection 204 the parser component 206 can be configured to search for citations to other research documents. For instance, the parser component 206 can be configured to review the bibliography in the research document to ascertain which documents have been cited to by the research document. If the parser component 206 ascertains that a research document in the document collection 204 includes a citation to another research document, the parser component 206 can extract the identity of the research document (the citing work) from such research document. Additionally, for each citation in the research document, the parser component 206 can extract such citation from the document. In other words, the parser component 206 can extract the identity of the document that is being cited to by the analyzed research document (the cited work). Still further, for each citation, the parser component 206 can be configured to extract a sentence or a summary of the sentence that includes the citation from the document. Therefore, in summary, the parser component 206, for each research document in the document collection 204, is configured to search the research document for citations and extract a tuple for each citation in the document, wherein the tuple includes the identity of the research document (the citing work), the identity of a research document that is being cited (the cited work), and a sentence (or summary thereof) that includes the citation (the citing sentence). These tuples can, for instance, be aggregated such that a search for a particular research document can result in the return of a plurality of citations that are included in that research document, a plurality of documents that cite to the research document, as well as a plurality of sentences that include the citations to the research document. As described previously, the visualizer component 124 may then generate a visualization based at least in part upon such information.

Figure 3:
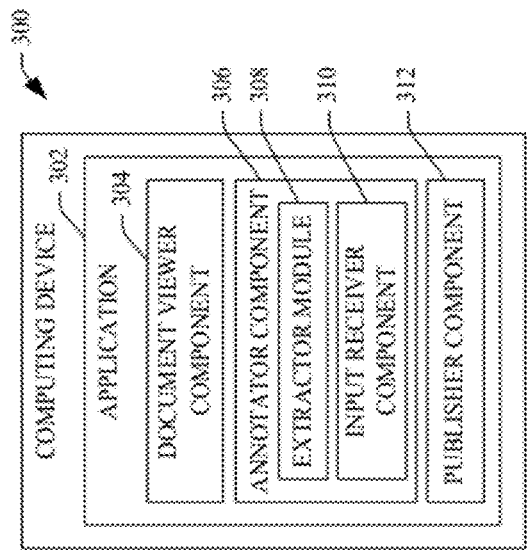
FIG. 3 illustrates an exemplary computing device that can be utilized in connection with assigning annotations to documents.

Referring now to FIG. 3, an exemplary depiction of a computing device 300 that can be utilized in connection with assigning annotations to documents is illustrated. As mentioned previously, document data can include annotations, as well as identities of annotators. The computing device 300 can be utilized in connection with generating annotations and assigning such annotations to research documents. The computing device 300 comprises an application 302 that is executing thereon. The application 302 can be a word processing application, a web browser, or other suitable application that is configured to display documents to users. The application 302 comprises a document viewer component 304 that facilitates displaying text or images in a research document to a user. That is, the document viewer component 304 can receive a data file and display text or images in human readable format on a display screen of the computing device 300, thereby allowing the user of the computing device 300 to review a research document that is being displayed through utilization of the application 302.

The application 302 executing on the computing device 300 further comprises an annotator component 306 that is configured to assign annotations (facts) to portions of a research document being displayed by the document viewer component 304 to the user, wherein such annotations have been approved by the user. Pursuant to an example, the annotator component 306 can comprise at least one extractor module 308 that is configured to extract text from a document that has been reviewed by the user. For instance, the extractor module 308 can be configured to search text of the document for a particular word or sentence structure. For example, it may be desirable to annotate each sentence that includes a citation to a different document. In such a case, the extractor module 308 can locate sentences that have citations to other documents therein, and can automatically extract annotations that comprise a tuple (a series of ordered elements), wherein the tuple includes a first word or phrase, a second word or phrase, and a third word or phrase that relates the first word phrase to the second word or phrase. For instance, the tuple can comprise a subject, predicate, object, triple that is extracted from the citing sentence.

The annotator component 306 can comprise an input receiver component 310 that is configured to receive user input with respect to an annotation generated by the extractor module 308 and/or to receive a manually generated annotation that comprises a tuple of the aforementioned format. For example, an automatically generated annotation (by the extractor module 308) can be provided to the document viewer component 304, which can present the annotation to the user. The user may wish to modify the annotation to add or change particular words or phrases in the annotation or to remove words or phrases from the annotation. The input receiver component 310 can receive this user input and the annotation can be modified pursuant to input from the user. In another example, the user may wish to provide an annotation that was not automatically generated by the extractor module 308. In such a case, for instance, the user can select a particular sentence being displayed to the user by the document viewer component 304, and can manually generate an annotation that is to correspond to such sentence. Again, this manual annotation can comprise a tuple of the form described above.

Once the user has completed annotating the document, the user may wish to cause such annotations to be shared with others. To that end, the application 302 can further comprise a publisher component 312 that can publish annotations to a data store that is accessible to others by way of the network (e.g., the data store 102). With more specificity, the publisher component 312 can generate a data packet that comprises the tuple and relationship data. The relationship data can include first data that identifies the document to which the annotation has been assigned, second data that identifies the identity of the annotator, third data that identifies the portion of the document to which the annotation has been assigned, and fourth data that identifies the author of the document to which the annotation has been assigned. Accordingly, the publisher component 312 can cause an annotation generated by way of the annotator component 306 to be included in the data packet and can also cause relationship data to be included in such data packet. Once the data packet has been generated, the publisher component 312 can cause a data packet to be transmitted to a particular location by way of a network. For instance, the publisher component 312 can have knowledge of an IP address, where annotations generated by multiple users across multiple documents are retained. Upon the user of the computing device 300 indicating that she wishes the annotations to be published, the publisher component 312 can generate the aforementioned data packet and cause the data packet to be transmitted to a computing address that is assigned the IP address known by the publisher component 312. Other mechanisms for causing data packets as described herein to be retained in the data store 102 that is accessible to others by way of a network connection are contemplated by the inventors and are intended to fall under the scope of the hereto appended claims.

Figure 4:
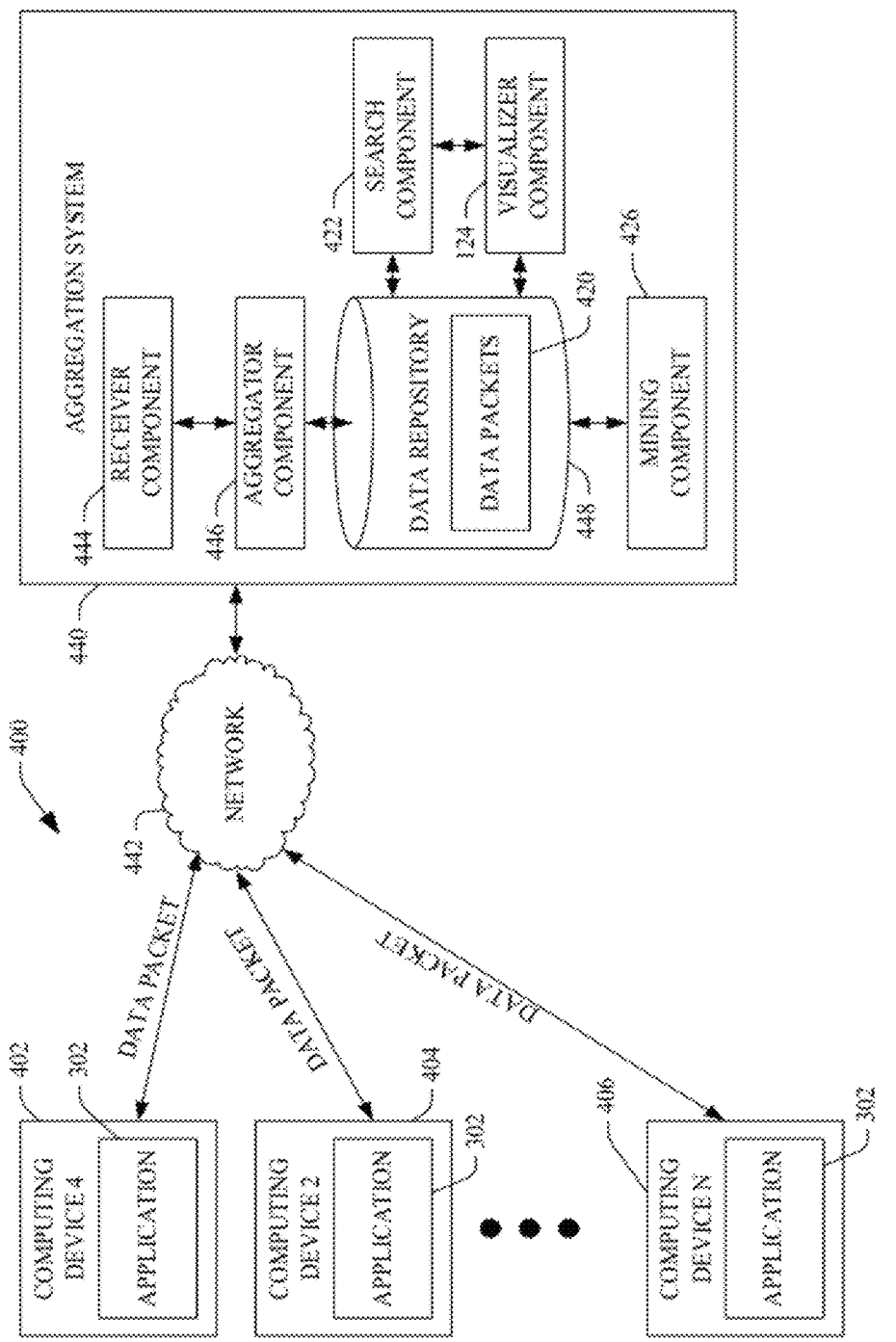
FIG. 4 is a functional block diagram of an exemplary system that facilitates aggregating annotations made to documents by a plurality of different users.

Turning now to FIG. 4, an exemplary system 400 that facilitates aggregating annotations made to documents by multiple users of different computing devices is illustrated. The system 400 comprises a plurality of computing devices 402-406. Specifically, the plurality of computing devices 402-406 comprises a first computing device 402, a second computing device 404, and an nth computing device 406. Each of the computing devices 402-406 has the application 302 executing thereon. The application 302 can be configured to allow a user to review documents and provide annotations to such documents. For instance, the application 302 may be a word processing application that comprises functionality that enables a user to provide annotations to a research document being reviewed by the user. In another example, the application 302 may be a web browser that allows users to generate annotations to content that is viewable by way of the web browser.

Users of the application 302 can assign annotations of the format described above to research documents being reviewed by way of the application 302. Annotations to research documents can be approved by users of the application 302, wherein an annotation can be generated by a user of the application 302 manually or automatically generated through utilization of one or more extractor modules. As mentioned previously, an extractor module can be configured to search through documents for particular words, phrases, sentence structures, etc. and to automatically generate annotations based at least in part upon such search. For instance, an exemplary extractor module can include natural language processing functionality that can identify different portions of sentences in a research document. The extractor module may also be configured to search through research documents for a particular word, and upon identifying such word in the research document can determine whether the word is a subject or object of a sentence in the document. The extractor module may then analyze the sentence that includes the identified word and, through natural language processing techniques, can automatically ascertain which words or phrases in the sentence is the subject, object, and predicate of such sentence. The subject, object, predicate can be extracted as a proposed annotation, and this automatically generated annotation can be presented to the user of the application 302, who can in turn approve the automatically generated annotation, modify the automatically generated annotation, or entirely reject the automatically generated annotation. Further, a user of the application 302 can manually assign an annotation to a research document without the use of an extractor module so long as that annotation has the aforementioned format (e.g., includes the above described tuple).

Pursuant to an example, a user of the client computing device 402 can initiate the application 302 such that the application 302 is executing on the first computing device 402. The user may cause the application 302 to display a particular research document that is desirably reviewed by the user of the first computing device 402. When reviewing such document, the user can generate or review and approve annotations that pertain to such document. Thereafter, the user may wish to publish these annotations such that the annotations can be reviewed by others who may also be interested in the research document, interested in a particular research field that pertains to the research document, etc. Therefore, through utilization of the application 302, the user of the first computing device 402 can choose to publish the annotations made to the research document that was reviewed through utilization of the application 302.

Upon receiving a command to publish the annotations in the document, the application 302 can generate a data packet. This data packet can include the annotation, which comprises a tuple of the first word or phrase, the second word or phrase, and the third word or phrase that relates the first and second words or phrases. The data packet generated by the application 302 can also include relationship data, wherein the relationship data can identify relationships between the annotation included in the data packet and data pertaining to the research document to which the annotation is assigned. It is to be understood that multiple reviewers of various research documents can use the application 302 to review and assigned annotations to such research documents, and may then choose to publish these annotations such that they can be shared and reviewed by others.

The system 400 further comprises an aggregation system 410 that is configured to aggregate data packets transmitted from the computing devices 402-406. For instance, the aggregation system 410 may be in communication with the computing devices 402-406 by way of a suitable network 412. Pursuant to an example, the network 412 can be the Internet. In another example, the network 412 may be a cellular network, an intranet or other suitable network such as a LAN, a wireless area network, etc. Responsive to, for instance, the user of the first computing device 402 choosing to publish facts corresponding to a document being reviewed by way of the application 302, at least one data packet is transmitted from the computing device 402 to the aggregation system 410 by way of the network 412. Furthermore, it is to be understood that each of the computing devices 402-406 may transmit multiple data packets to the aggregation system 410 by way of the network 412.

The aggregation system 410 can comprise a plurality of components that are executable by a processor. Thus, the aggregation system 410 may be included in, for instance, a server system that comprises at least one processor and corresponding memory, wherein components in the memory are accessible and executable by the processor. The plurality of components comprise a receiver component 414 that receives a data packet transmitted by way of the application 302 executing on the first computing device 402 as described above. The data packet has a first format and includes an annotation and corresponding relationship data.

The aggregation system 410 further comprises an aggregator component 416 is in communication with receiver component 414, wherein the aggregator component 416 is configured to place the data packet received by the receiver component 414 with other data packets of the first format in a data repository 418. The aggregator component 416 can cause a plurality of different data packets that were received from a plurality of different computing devices with respect to a plurality of different research documents that were assigned a plurality of different annotations, and can cause all of such data packets to be retained in a data repository 418 as data packets 420. The aggregator component 416, for instance, can be configured to aggregate the data packets 420 in the data repository 418 in some suitable database format such that the data packets 420 are readily processable by a computer processor. This aggregation of multiple annotations pertaining to multiple different research documents by different annotators creates a network of knowledge that was heretofore unavailable. In other words, the data packets 420 can be retained in the data repository 418 by the aggregator component 416 in a format suitable for a processor to perform at least one processing function over at least one of the data packets in the data packets 420. In addition, the data repository 418 can be configured to retain citation data that was mentioned previously.

The aggregation system 410 may optionally include a search component 422 that can receive a query by way of the network 412, for instance, and execute a search over the packets 420 in the data repository 418 based at least in part upon the query. For instance, the query received by the search component 422 can include a word or phrase, and the search component 422 can be configured to search for annotations in the data packets 420 that comprise the word or phrase. The search component 422 may then be configured to output search results to the user responsive to execution of the search over the data packets 420, wherein the search results can include annotations that comprise the word or phrase in the query (or related words or phrases) as well as relationship data corresponding to such annotations. In another example, the search component 422 can receive the name of an author as a query and the search component 422 can retrieve annotations in the data packets 420 that were authored by the author or that were assigned to research documents that were authored by such author.

The aggregation system 410 may further optionally comprise the visualizer component 124 that can visualize annotations and relationships corresponding to these annotations. Pursuant to an example, the visualizer component 124 can be in communication with the search component 422 and can visualize relationships between annotations and corresponding research documents, authors, or other annotations retrieved by the search component 422. Furthermore, as mentioned previously, the visualizer component 124 can generate a graphical summary of a document by visualizing a particular research document, annotations assigned to the research document, citations to the research document, sentences corresponding to citations to the research document, etc. It is to be understood, however, that any suitable manner for visualizing relationships that are defined in the data packets and/or citation data is contemplated and intended to fall under the scope of the hereto appended claims.

The aggregation system 410 may further optionally include a mining component 426 that performs a data mining function over the data packets 420 in the data repository 418. For instance, the mining component 426 may be configured to search for patterns in the data packets 420 retained in the data repository 418 such that, for example, identities of authors that comments on a particular topic frequently can be ascertained, identities of authors that are frequently co-cited can be obtained, etc. Relationships or patterns located by the mining component 426 can be output or can influence searches undertaken by the search component 422.

Figure 5:
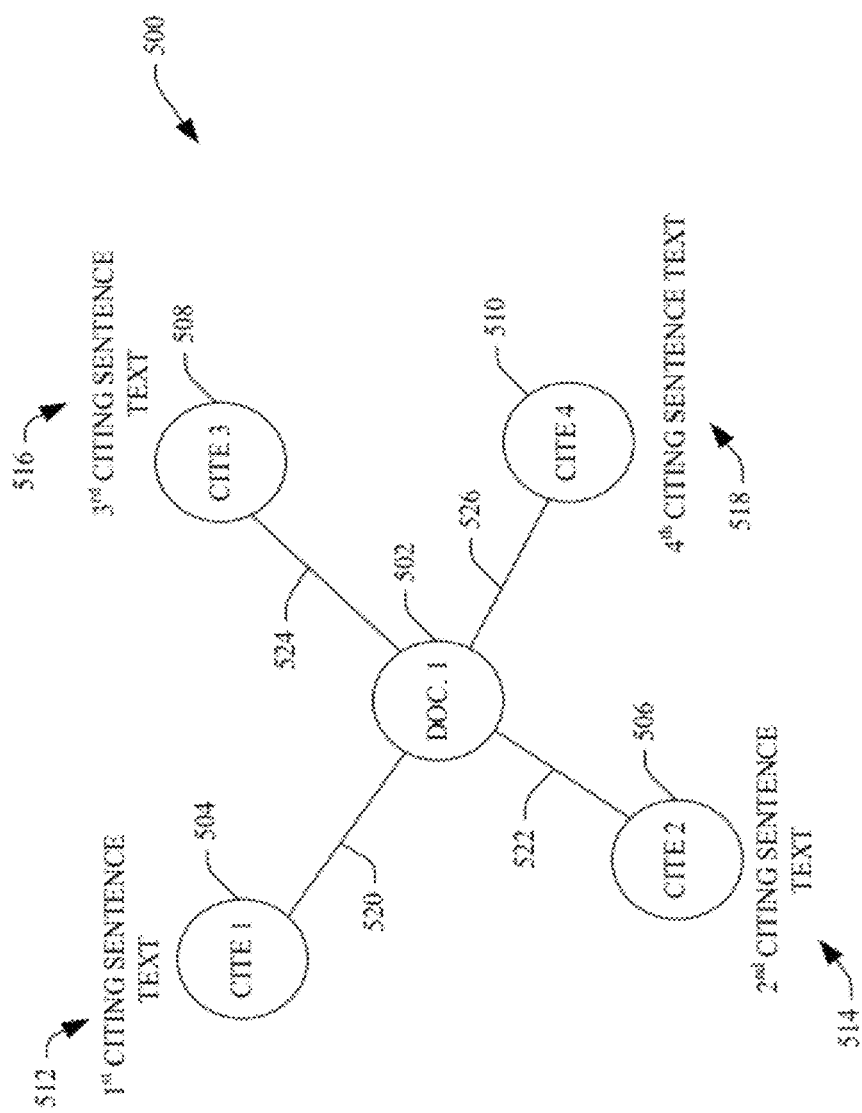
FIG. 5 is an exemplary graphical visualization of a document.

Turning now to FIG. 5, an exemplary graphical visualization 500 that can be output by the visualizer component 124 is illustrated. The graphical visualization 500 comprises a first node 502 that is representative of a first research document. For instance, the first research document can be the subject of a search query issued by the user 120. Accordingly, the first node 502 can be displayed at or near the center of the visualization 500. Additionally, the first node 502 may be displayed in a certain color to cause the first node 502 to be visually distinct from other nodes in the visualization 500. While the first node 502 is shown to represent a first research document, it is to be understood that in other embodiments, the first node 502 may represent an author, an annotation, a citation, or other data included in the first document data 104 in the data store 102.

The exemplary visualization 500 further comprises a second node 504, a third node 506, a fourth node 508, and a fifth node 510. The nodes 504-510 can represent a first citation to the first research document, a second citation to the first research document, a third citation to the first research document, and a fourth citation to the first research document, respectively. In another exemplary embodiment, the nodes 504-510 can represent research documents that include citations to the first research document. In still yet another exemplary embodiment, the nodes 504-510 can represent annotations assigned to the first research document, can represent authors of the first research document, etc.

The exemplary graphical visualization 500 can further comprise at least portions of sentences 512-518 that include the citations to the first research document. With more specificity, the second node 504 can represent a citation to the first research document (represented by the first node 502), and the citing sentence 512 that includes the citation represented by the second node 504 can be displayed in graphical relation to the second node 504. In other words, a second research document can include a citation to the first research document. The second node 504 can represent such citation to the first research document, and the sentence 512 or at least a portion of the sentence that includes the citation represented by the second node 504 can be displayed in graphical relation to the second node 504. As used herein, the term "in graphical relation" can mean that the citing sentence text is immediately directly proximate to the second node 504. In another example, "in graphical relation" can refer to the citing sentence text being shown in the same color in which the second node 504 is shown, thereby indicating to the user 120 that the citing sentence text corresponds to the second node 504. Other mechanisms for illustrating to the user 120 that the citing sentence 512 corresponds to the second node 504 is intended to be covered by the term in graphical relation as utilized in the claims.

The graphical visualization 500 also comprises a first edge 520 that couples the first node 502 with the second node 504, a second edge 522 that couples the first node 502 with the third node 506, a third edge 524 that couples the first node 502 with the fourth node 508, and a fourth edge 526 that couples the first node 502 with the fifth node 510. In this example, the edges 520-526 can indicate that the citations represented by the nodes 504-510 include citations to the first research document represented by the first node 502.

It can be ascertained that the graphical visualization 500 can represent a summary of the first research document represented by the first node 502 from a perspective that is backwards facing with respect to time. That is, the graphical visualization 500 can quickly depict to the user 120 how the first research document represented by the first node 502 has been influential in a particular research field. This is because the sentences that include citations to the document represented by the first node 502 can be indicative of what the citing authors thought was interesting about the first research document, and are not from perspective of the author of the first research document. It is also to be understood that other graphical information can be displayed together with the visualization 500 including the abstract of the first research document represented by the first node 502, research documents that were cited by the first research document, data pertaining to an author of the first research document, amongst other data.

Figure 6:
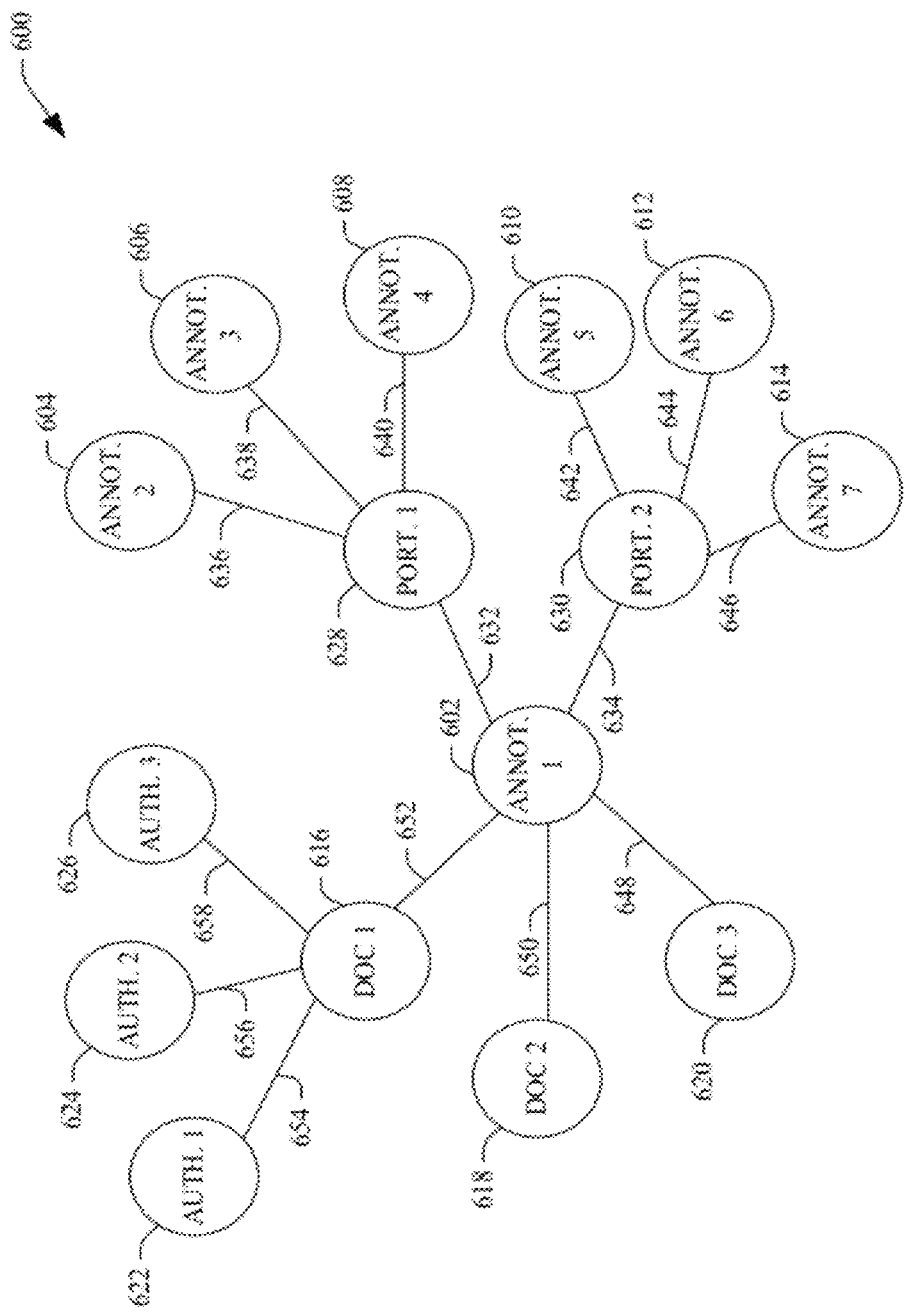
FIG. 6 is another exemplary graphical visualization of a research document.

With reference now to FIG. 6, another exemplary visualization 600 that can be presented to a user is illustrated. The visualization 600 can display various relationships between annotations, authors, documents, citations, and the like to a user that is, for instance, performing a search in a particular research field. In the exemplary visualization 600, such visualization 600 is depicted as a graph and comprises a plurality of nodes and corresponding edges. While a graph of this form is one manner of visualizing data, it is to be understood that other visualization schemes are contemplated.

The exemplary visualization 600 comprises a plurality of nodes 602-630. Additionally, the visualization 600 comprises a plurality of edges 632-658 that couple nodes, wherein an edge between two nodes indicates some relationship between entities represented by the nodes. Pursuant to an example, the visualization 600 may be presented to the user 120 responsive to the user 120 performing a search that matches a first annotation that is represented by the node 602. Edges 648,650 and 652 between the node 602 and nodes 616, 618 and 620, respectively, indicate that document one, document two and document three, which are represented by the nodes 616-620, respectively, include the annotation represented by the node 602. Thus, the viewer of the visualization 600 can quickly ascertain that documents one, two and three comprise the first annotation.

The visualization 600 further comprises the nodes 622, 624, and 626, which represent three different authors. The edges 654, 656 and 658 between the nodes 616 and 620, the nodes 616 and 624, and the nodes 616 and 626 indicate that the authors represented by the nodes 622-626 authored the document represented by the node 616.

As has been described herein, the annotation represented by the node 602 comprises a tuple. Pursuant to an example, the visualization 600 can be configured to display portions of the tuple. For instance, if a tuple comprises a subject of a sentence, a predicate and a corresponding object of the sentence, then portions of the annotation may comprise a subject and an object. The node 628 can represent a subject of the first annotation and the nodes 632 can represent an object that is in the first annotation. The edges 632 and 634 can indicate to the user that the nodes 628 and 630 represent portions of the annotation represented by the node 602.

The nodes 604, 606 and 608 can represent other annotations that have been assigned to documents by users that include the portion of the annotation represented by the node 628. This relationship between the portion represented by the node 628 and annotations represented by the nodes 604-608 is illustrated to the user by the edges 636-640.

Similarly, the nodes 610, 612, and 614 represent annotations that comprise the portion of the annotation represented by the node 630. Again, this relationship between the portion of the annotation that is represented by the node 630 and annotations represented by the nodes 610-614 is depicted to the user via the edges 642, 644, and 646, respectively.

Furthermore, the visualization 600 can be interactive such that if the user selects one of the nodes shown in the visualization 600, the visualization 600 can change and additional information can be provided to the user. For instance, a number of nodes displayed to the user may be constrained based upon display screen space that is available to display the visualization 600. Accordingly, selection of a different node can cause other nodes not shown in this visualization 600 to be presented to the user, thereby illustrating to the user a network of relationships between annotations, documents, authors, citations, etc.

Moreover, different nodes and/or edges can be provided with different colors or line weights to indicate type of entity that the nodes represent and/or strengthen the relationship between entities. For instance, nodes that represent annotations can be displayed in a first color, nodes that represent documents can be displayed in a second color, nodes that represent authors can be displayed in a third color, and so on. Furthermore, while the visualization 600 is shown to include nodes that represent annotations, documents, authors, and partial annotations, it is to be understood that the visualization 600 may also be desirably configured to include nodes that represent citations or other suitable information.

Figure 7:
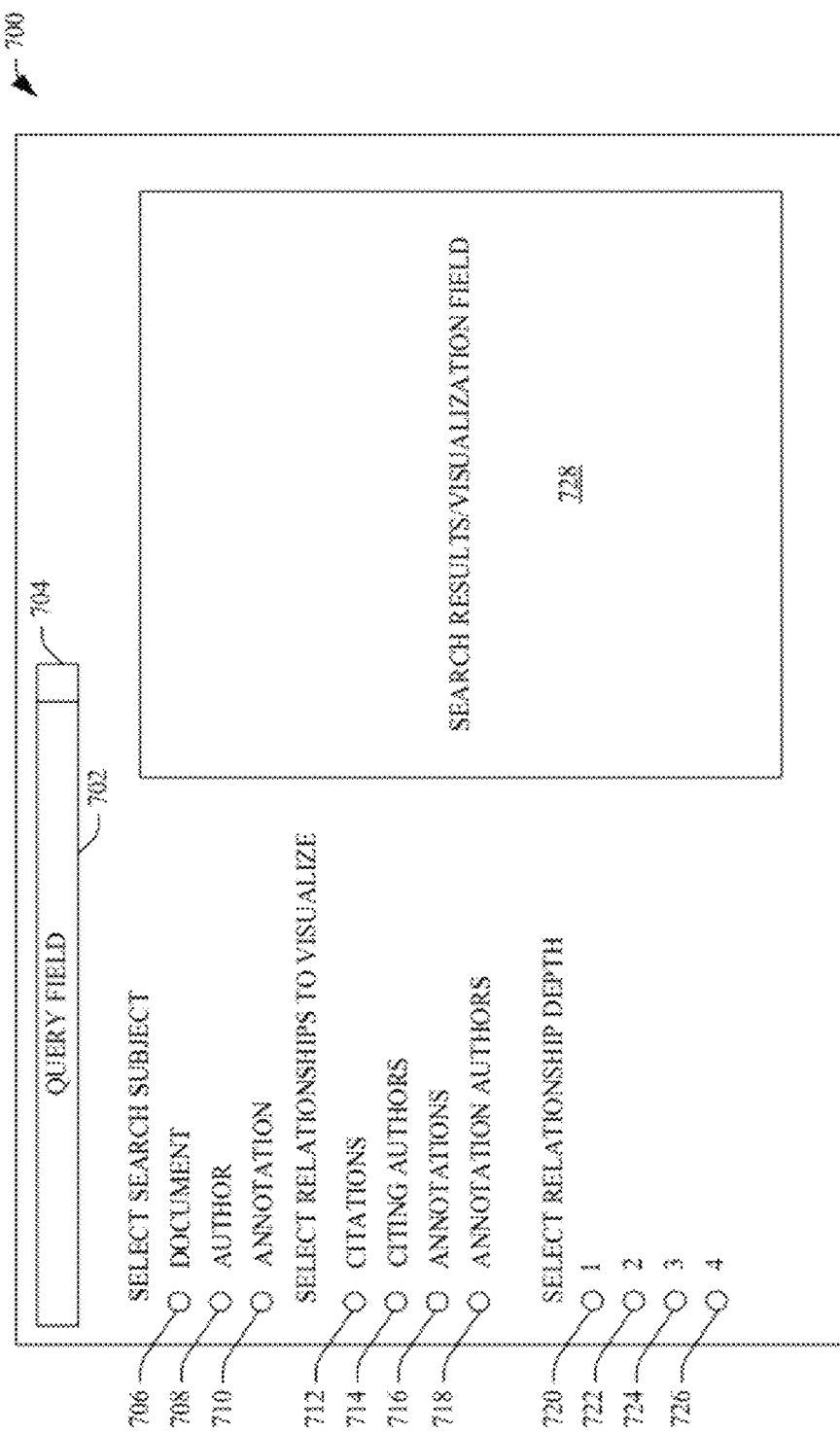
FIG. 7 is an exemplary graphical user interface that facilitates providing a graphical visualization of a research document to a user.

Now referring to FIG. 7, an exemplary graphical user interface 700 that can be utilized in connection with presenting a graphical visualization to a user is illustrated. The graphical user interface 700 comprises a query field 702 that is configured to receive a textual query from the user 120. It is to be understood, however, that other forms of receiving a query are contemplated such as through touch, gesture, voice, etc. The graphical user interface 700 also includes a depressible button 704 that is in graphical relation to the query field 702, wherein user depression of the graphical button 704 causes a query that is included in the query field 702 to be issued or executed over data (e.g., data in a data repository 102).

The graphical user interface 700 comprises a plurality of tools that allow the user 120 to customize a manner in which the visualization is presented and/or to customize what information is presented in the visualization. For instance, the graphical user interface 700 can comprise a plurality of checkboxes, buttons or the like, which are collectively labeled as graphical objects 706-710. Such graphical objects 706-710 allow the user 120 select a type of information that is to be the subject of the visualization. For instance, selection of the first graphical object 706 can cause a search to be restricted to research documents, selection of the second graphical object 708 can cause the search to be restricted to authors of research documents, and selection of the third graphical object 710 can cause the search to be restricted to annotations assigned to research documents. Other graphical objects can also be included in the graphical user interface 700 such that the user can search over a particular type of information for presentation in a graphical visualization.

The graphical user interface 700 can also comprise a second plurality of selectable graphical objects 712-718. These selectable graphical objects 712-718 allow the user 120 to indicate relationships that are desirably visualized in connection with the type of objects or information that is being searched over. For instance, the user 120 may select the first graphical object 706 to indicate that a query provided in the query field 702 is desirably executed to locate a particular research document. The user 120 may also select the fourth graphical object 712 to indicate that the user 120 wishes to have citations to a document visually presented to the user (such as shown in the graphical visualization 500). Accordingly, if the user 120 selected the first graphical object 706 and the fourth graphical object 712, and issued a query for a particular document, then a visualization similar to the graphical visualization 500 shown in FIG. 5 can be presented to the user 120. The user may select several of the graphical objects 712-718, thereby causing a relatively rich visualization to be presented to the user 120. For instance, if the user selected each of the graphical objects 712-718 and also selected the first graphical object 706, and subsequently issued a query, a resulting visualization can include a node that is representative of a first research document that was the subject of a query together with a plurality of nodes arranged in graphical relation to such node. The plurality of other nodes can include nodes that represent citations to the first research document, authors of research documents that cited the first research document, annotations assigned to the first research document, and authors of annotations to the first research document.

The graphical user interface 700 may also comprise a third plurality of selectable graphical objects 720-726. Selection of one of these selectable graphical objects 723-726 can dictate a depth of relationship to display to the user 120 in a resulting graphical visualization. In an example, the user 120 may wish to be provided with a significant amount of information pertaining to a particular author. Accordingly, the user 120 can issue a query in query field 702 germane to the author, can select the second graphical object 708, can select one or more of the graphical objects 712-718, and may then select graphical object 726 to indicate that a relationship depth of four is desired. Accordingly, a visualization generated can include a node that is representative of the author in the center, as well as nodes that are shown as being as far as four edges in distance from the node that is representative of the author. The user 120 may then select on particular nodes in such visualization to navigate or learn about other entities represented by such nodes. For instance, the user may initially be interested in the author but then they ascertain from the visualization that the author was an author of a particular document. The user may then select such document, which can cause the visualization to be regenerated such that the node representative of the document is shown in the center of the visualization.

Figure 8:
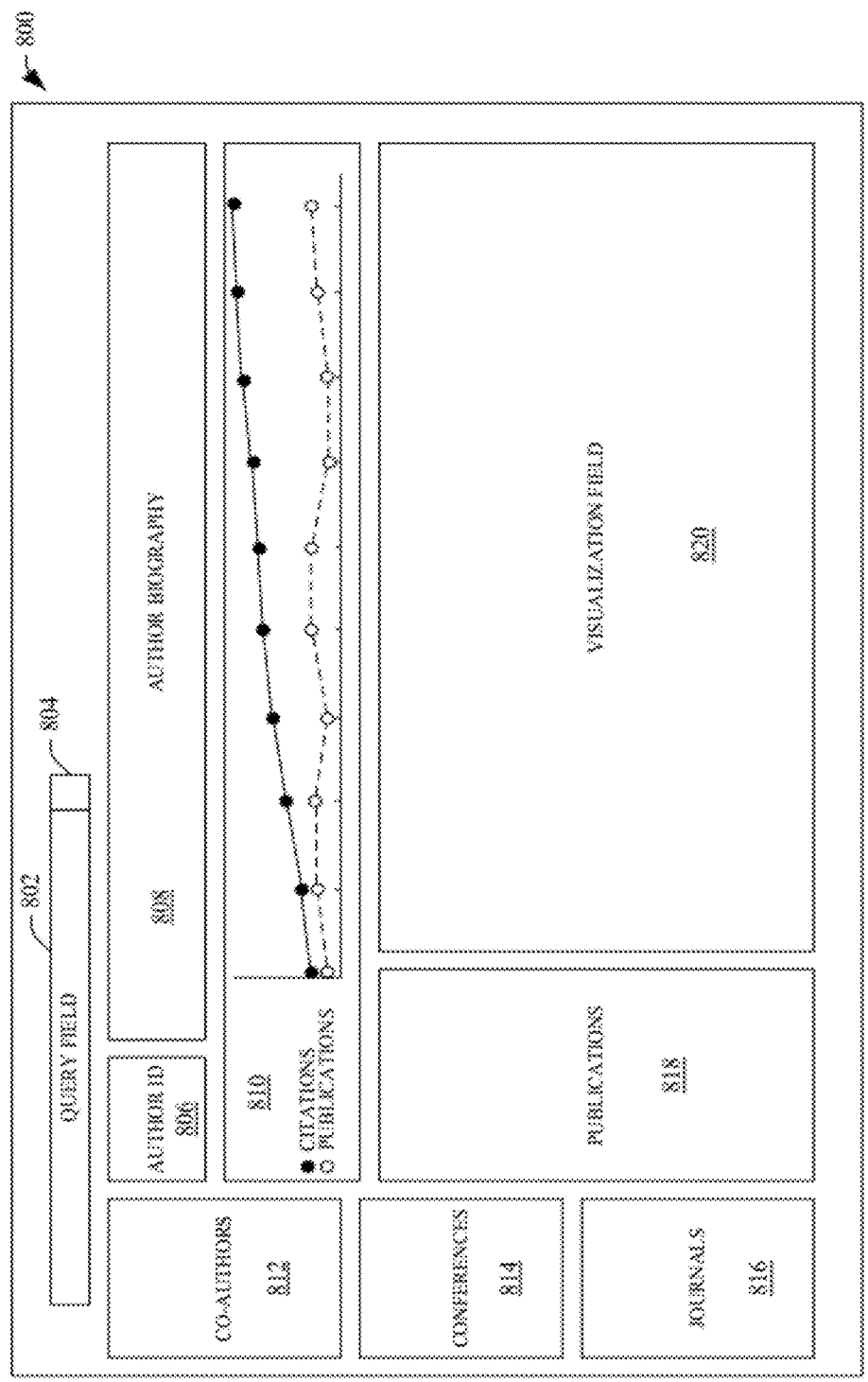
FIG. 8 is another exemplary graphical user interface that facilitates providing a visualization of a research document to a user.

Turning now to FIG. 8, another exemplary graphical user interface that corresponds to a particular author is illustrated. The graphical user interface 800 comprises a query field 802 and a depressible button 804, wherein the user 120 can enter a query into the query field 802 germane to a particular author. The graphical user interface 800 further comprises a first field 806 that includes data that is indicative of the identity of the author. This data can include an image of the author, if available. The graphical user interface 800 also comprises a second field 808 that includes biographical information pertaining to the author. The biographical information shown in the second field 808 can comprise current location of the author, a number of research documents authored by the author, a number of citations to research documents authored by the author, etc.

The graphical user interface 800 can also comprise a third field 810 that includes a graph that visually depicts a number of research documents authored by the aforementioned author versus a number of citations to research documents authored by the author over time. Accordingly, by viewing a graph shown in the third field 810, the user 120 can obtain an understanding of the influence of the author (as a number of citations to publications of the author is indicative of influence of the author in at least a particular field).

The graphical user interface 800 can also comprise a fourth field 812 that includes a list of co-authors. For example, the author that is the subject of the search may have a plurality of different co-authors on a plurality of different research documents. The list of co-authors presented in the fourth field 812 can be shown as selectable hyperlinks, wherein if the user 120 selects one of the co-authors, the content of the graphical user interface 800 can change to display information pertaining to the selected co-author.

A graphical user interface 800 may further comprise a fifth field 814 that presents a list of conferences that the author has participated in to the user 120. The user 120 can select, for instance, one of the conferences listed in the fifth field 814, which can cause the user to be directed to a web page corresponding to the selected conference. Similarly, the graphical user interface 800 can include a sixth field 816 that displays a list of journals that include documents authored by the author. The list of journals can be displayed as a plurality of hyperlinks, wherein selection by the user 120 of one of the journals can cause the user 120 to be directed to a web page that is associated with the selected journal.

The graphical user interface 800 can further comprise seventh field 818 that includes a list of publications authored by the author. For instance, the publications in seventh field 818 can be arranged by date, by number of citations to such documents, by popularity, alphabetically etc. Selection of a publication from the seventh field 818 can cause, for instance, a visualization pertaining to the selected publication to be presented to the user 120. Alternatively, selection of a publication shown in the seventh field 818 can cause the user to be presented with such publication. The graphical user interface 800 further comprises a visualization field 820 that is configured to present a visualization generated by the visualizer component 124 pertaining to the author, a document published by the author, etc. to the user 120.

Figure 9:
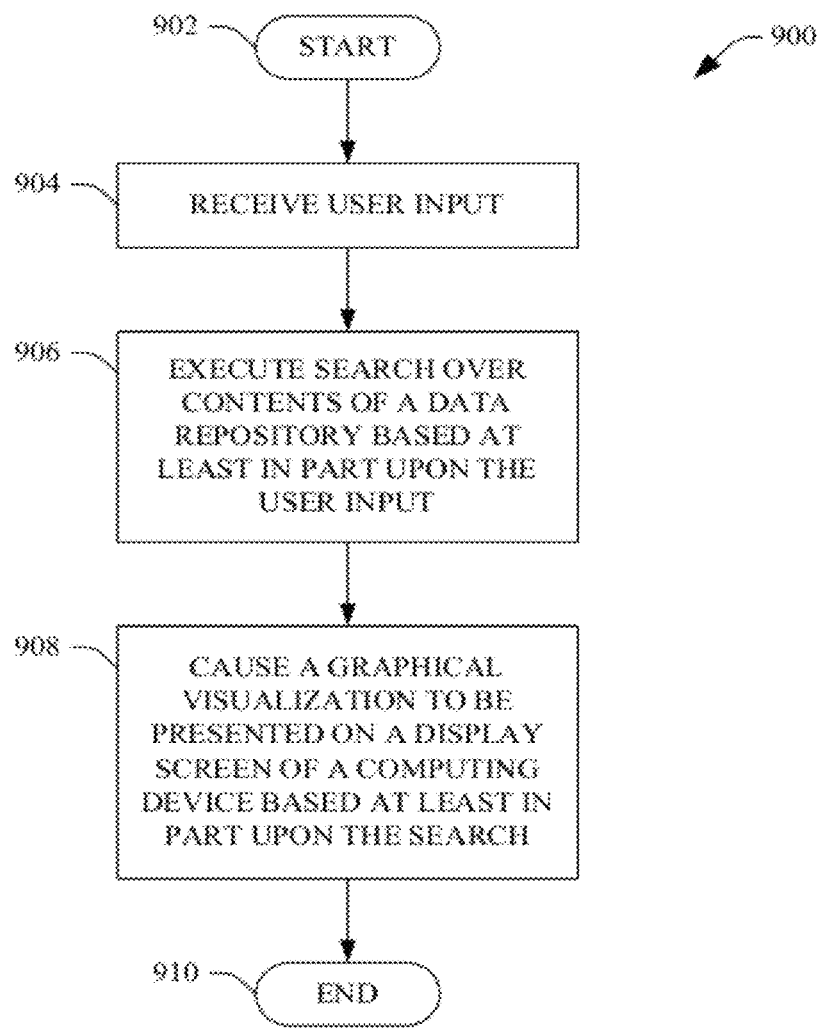
FIG. 9 is a flow diagram that illustrates an exemplary methodology for causing a graphical visualization of a research document to be presented on a display screen of a computing device.
Figure 10:
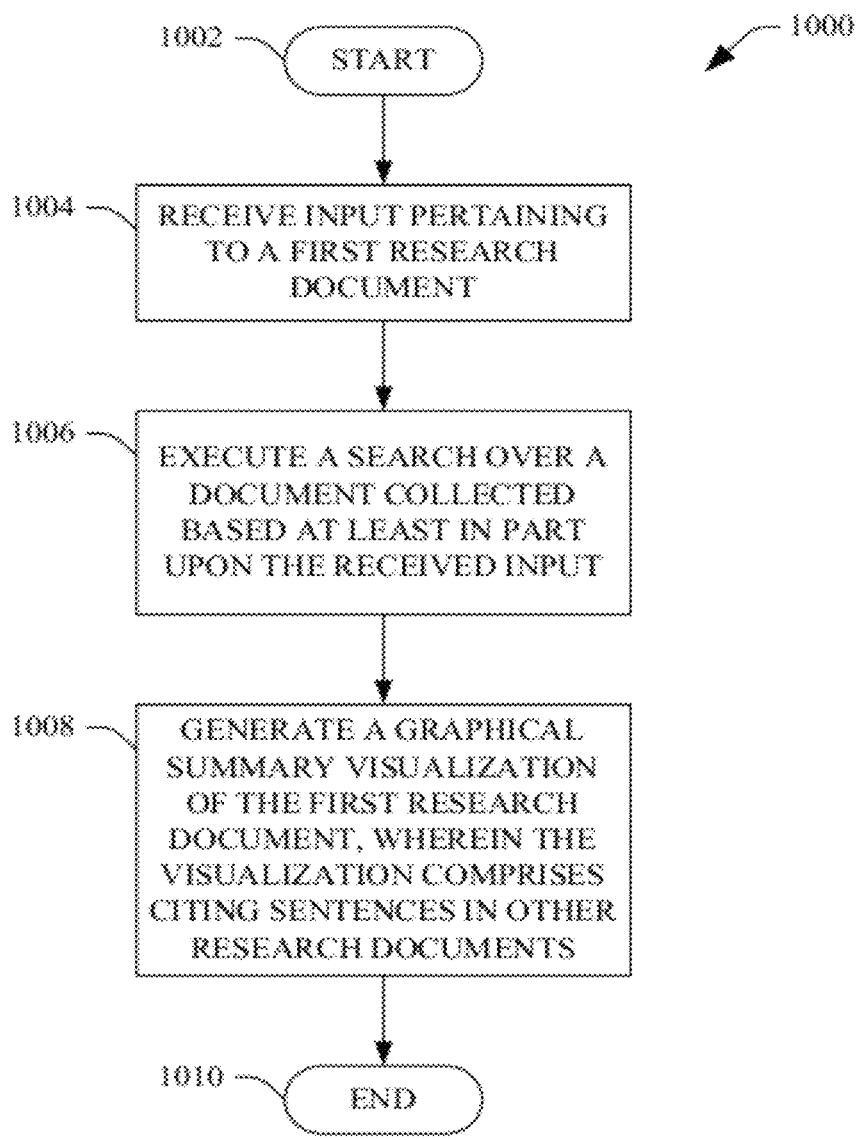
FIG. 10 is a flow diagram that illustrates an exemplary methodology for generating a graphical summary visualization of a research document.

With reference now to FIGS. 9-10, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Now referring to FIG. 9 an exemplary methodology 900 that facilitates causing a graphical visualization to be presented on a display screen of a computing device is illustrated. The methodology 900 starts at 902, and at 904, input from a user is received. This input may be, for instance, a textual query, a selection of a node in a graphical visualization, a spoken command, a gesture, or the like.

At 906, a search over contents of a data repository is executed based at least in part upon user input. The data repository can include first data that identifies a first research document, wherein the first research document can include a plurality of citations. The content of the data repository can also include second data that indicates that a second research document comprises a citation to the first research document. Furthermore, the contents of the data repository can comprise a sentence in the second research document that includes the citation to the first research document. Therefore, for instance, if the user input received at 904 was germane to the title of the first research document, the search executed at 906 could be utilized to retrieve an identity of the second research document that includes the citation to the first research document, as well as the sentence in the second research document that includes such citation.

At 908, based at least in part upon the search executed at 906, a graphical visualization is caused to be displayed on a display screen of a computing device to the user. The graphical visualization shown to the user includes at least one node that is representative of the first research document, at least one graphical object that visually indicates that the second research document comprises a citation to the first research document, and at least a portion of the sentence in the second research document that includes the citation to the first research document. Pursuant to an example, the at least one graphical object can be an edge that couples the at least one node to at least one other node in the graphical visualization, wherein the at least one other node is representative of the citation to the first research document. Alternatively, the at least one other node can be representative of the document that includes the citation (the second research document). In still yet another example, the at least one other node can be representative of an author of the second research document. The methodology 900 completes at 910.

With reference now to FIG. 10, an exemplary methodology 1000 that facilitates generating a graphical summary of visualization of a research document is illustrated. The methodology 1000 starts at 1002, and at 1004, input pertaining to a first research document is received from a user, wherein the first research document is authored by an author, and wherein the first research document is cited to by a plurality of other research documents.

At 1006, a search over a document collection is executed based at least in part upon the input, wherein the first research document and citations to the first research document by the plurality of other research documents are located during the execution of the search over the document collection.

At 1008, subsequent to executing the search over the document collection, a graphical summary visualization of the first research document is generated. The graphical summary visualization comprises a first node that is representative of the first research document, a plurality of other nodes that are representative of the plurality of other research documents that cite the first research document, citing sentences in the plurality of other research documents that include citations to the first research documents, and a plurality of edges that couple the first node and the plurality of other nodes, respectively. The methodology 1000 completes at 1010.

Figure 11:
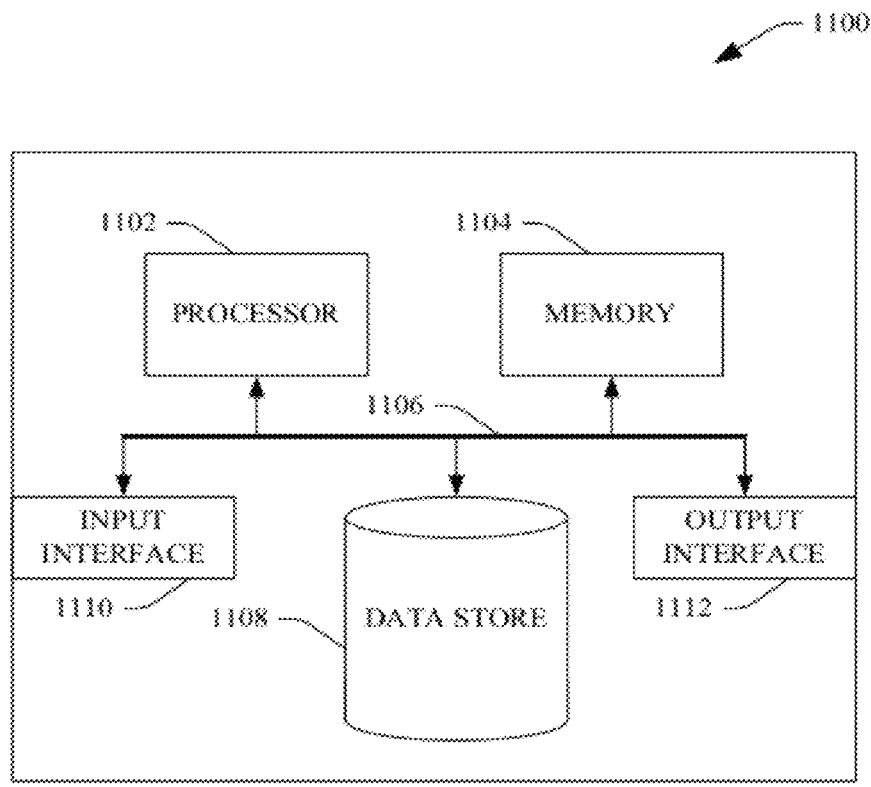
FIG. 11 is an exemplary computing system.

Now referring to FIG. 11, a high-level illustration of an exemplary computing device 1100 that can be used in accordance with the systems and methodologies disclosed herein is illustrated. For instance, the computing device 1100 may be used in a system that supports generating a graphical visualization of a research document. In another example, at least a portion of the computing device 1100 may be used in a system that supports acquiring data from research documents that can be utilized in connection with generating a graphical visualization of a research document. The computing device 1100 includes at least one processor 1102 that executes instructions that are stored in a memory 1104. The memory 1104 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store data pertaining to research documents, such as research document identities, citations, annotations, etc.

The computing device 1100 additionally includes a data store 1108 that is accessible by the processor 1102 by way of the system bus 1106. The data store may be or include any suitable computer-readable storage, including a hard disk, memory, etc. The data store 1108 may include executable instructions, data germane to research documents, visualizations, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component", "system", and "module" are intended to encompass hardware, software, or a combination of hardware and software. Thus, for example, a component, system, or module may be a process, a process executing on a processor, or a processor. Additionally, a component, system, or module may be localized on a single device or distributed across several devices. Furthermore, a component, system, or module may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a processor of a computing device, the method comprising:
    generating a graphical summary of a research document for presentment on a display of a computing device in response to receipt of user input that identifies the research document, the research document having a publication date assigned thereto that indicates a date upon which the research document was published, the graphical summary of the research document is based upon content from other research documents, the other research documents include citations to the research document, the other research documents having publication dates that are subsequent to the publication date of the research document, the graphical summary of the research document comprises:
        a node that is representative of the research document; and
        portions of sentences in the other research documents that include the citations to the research document; and
    presenting the graphical summary of the research document on the display of the computing device.

2. The method of claim 1, wherein the user input is a textual query.

3. The method of claim 1, wherein the user input is a selection of the node in a graphical visualization.

4. The method of claim 1, wherein the graphical summary of the research document further comprises:
    a second node that represents a citation to the research document in a second research document, the second research document included in the other research documents; and
    an edge that couples the node to the second node in the graphical summary of the research document.

5. The method of claim 4, wherein at least a portion of a sentence in the second research document is displayed in graphical relation with the second node in the graphical summary of the research document.

6. The method of claim 1, wherein the graphical summary of the research document further comprises a second node that is representative of an author of a second research document, the second research document included in the other research documents.

7. The method of claim 6, wherein the graphical summary of the research document further comprises an edge that couples the node with the second node.

8. The method of claim 1, wherein the graphical summary further comprises:
    a second node that is representative of an annotation made to the research document by a non-author of the research document, at least a portion of the annotation displayed in graphical relation to the second node; and
    an edge that couples the node to the second node.

9. The method of claim 4, wherein the node is displayed in a first color and the second node is displayed in a second color.

10. The method of claim 1, further comprising:
    receiving a user selection of a portion of a sentence in the graphical summary of the research document, the portion of the sentence included in the portions of the sentences; and
    causing an entirety of the sentence to be presented on the display responsive to receiving the user selection of the portion of the sentence.

11. The method of claim 1, wherein the graphical summary of the research document further comprises:
    data that identifies an author of the research document; and
    data that identifies at least one other publication authored by the author of the research document.

12. A system, comprising:
    at least one processor; and
    memory that stores instructions that, when executed by the at least one processor, cause the at least one processor to perform acts comprising:
        receiving user input that is indicative of a first research document, the first research document is authored by an author and has a publication date, the publication date indicative of a date upon which the first research document was published, wherein a second research document comprises a sentence that includes a citation to the first research document, the second research document has a publication date that is subsequent to the publication date of the first research document; and
        in response to receipt of the user input, generating a graphical summary of the first research document, the graphical summary comprising portions of sentences included in research documents having publication dates that are subsequent to the publication date of the first research document, the portions of the sentences comprising a portion of the sentence in the second research document that includes the citation to the first research document.

13. The system of claim 12, wherein the first research document has an annotation authored by a user who is not the author of the first research document, and wherein the graphical summary of the first research document comprises at least a portion of the annotation.

14. The system of claim 12, the acts further comprising locating the sentence in the second research document that includes the citation to the first research document.

15. The system of claim 12, wherein the user input is a textual query for the first research document.

16. The system of claim 12, wherein the user input is a selection of a graphical object in a graphical visualization that is representative of the first research document.

17. The system of claim 12, wherein the sentences each include a citation to the first research document.

18. The system of claim 12, wherein the graphical summary of the first research document further comprises a first node that is representative of the first research document, a second node that is representative of the citation to the first research document, and an edge that couples the first node and the second node.

19. A computer-readable memory comprising instructions that, when executed by a processor, cause the processor to perform acts comprising:
receiving input from a user, wherein the input pertains to a research document, the research document is authored by an author and was published on a publication date, the research document cited to by other research documents that have publication dates subsequent to the publication date of the research document;
executing a search over a document collection based upon the input, wherein the research document and citations to the research document by the other research documents are located in the search; and
subsequent to executing the search over the document collection, generating a graphical summary visualization of the research document, the graphical summary visualization being a summary of the research document, the graphical summary visualization comprises:
a first node that is representative of the research document;
a plurality of other nodes that are representative of the other research documents that cite to the research document, the plurality of other research documents comprising a plurality of sentences that include citations to the research document, the plurality of sentences shown in graphical relation to the plurality of other nodes; and
a plurality of edges that couple the first node and the plurality of other nodes.

20. The computer-readable memory of claim 19, the input being a selection of a graphical object that is representative of the research document.

\* \* \* \* \*